United States Patent
Rajab et al.

(10) Patent No.: US 10,309,791 B2
(45) Date of Patent: Jun. 4, 2019

(54) VIRTUAL TOWING

(71) Applicant: Honda Motor Co., Ltd., Tokyo (JP)

(72) Inventors: Samer Rajab, West Bloomfield, MI (US); Sue Bai, Novi, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/931,926

(22) Filed: Nov. 4, 2015

(65) Prior Publication Data

US 2017/0122757 A1    May 4, 2017

(51) Int. Cl.
G01C 21/34    (2006.01)

(52) U.S. Cl.
CPC ....... *G01C 21/3438* (2013.01); *G01C 21/343* (2013.01)

(58) Field of Classification Search
CPC .............. G01C 21/3438; G01C 21/3446; G01C 21/20
See application file for complete search history.

(56) References Cited

U.S. PATENT DOCUMENTS

| | | | |
|---|---|---|---|
| 8,643,505 B2 | 2/2014 | Tsuda et al. | |
| 8,744,666 B2* | 6/2014 | Switkes | G08G 1/166 |
| | | | 280/292 |
| 8,942,864 B2 | 1/2015 | Nemoto | |
| 9,043,141 B2* | 5/2015 | Kono | G01C 21/3469 |
| | | | 701/461 |
| 9,076,341 B2 | 7/2015 | Funabashi | |
| 9,165,470 B2 | 10/2015 | Mudalige et al. | |
| 2009/0140887 A1* | 6/2009 | Breed | G01C 21/165 |
| | | | 340/990 |
| 2011/0153629 A1* | 6/2011 | Lehmann | G06Q 10/06 |
| | | | 707/758 |
| 2012/0041675 A1* | 2/2012 | Juliver | G06Q 10/08 |
| | | | 701/465 |
| 2013/0046457 A1* | 2/2013 | Pettersson | G01C 21/3469 |
| | | | 701/117 |
| 2013/0219294 A1 | 8/2013 | Goldman-Shenhar et al. | |
| 2015/0120126 A1* | 4/2015 | So | G01C 23/00 |
| | | | 701/26 |
| 2015/0127189 A1* | 5/2015 | Mehr | B60W 30/165 |
| | | | 701/1 |
| 2015/0276422 A1* | 10/2015 | Bouve | G08G 1/096775 |
| | | | 701/538 |
| 2016/0267795 A1 | 9/2016 | Miyazawa et al. | |

* cited by examiner

*Primary Examiner* — Jerrah Edwards
*Assistant Examiner* — Mathew Franklin Gordon
(74) *Attorney, Agent, or Firm* — Rankin, Hill & Clark LLP

(57) ABSTRACT

A system and method of multipoint virtual towing of a trailer vehicle by a plurality of different tractor vehicles is provided. A multi-point virtual tow route schedule is determined which segments a requested trailer tow path into tow segments and distributes the segments among different tractor vehicles optimally achieve the purpose of towing the trailer vehicle from an origin to a destination. A best multi-point virtual tow route schedule is selected from candidate multi-point virtual tow route schedules generated from proposed virtual tow parameters corresponding to prospective tractor vehicles offering tow services. The selected multi-point virtual tow route schedule includes a route origin, a route destination, and a plurality of tow segments each corresponding to an accepted tractor vehicle, a link up location, link up location distance range, a link up timeframe, a drop off location, a drop off location distance range, and a drop off timeframe.

20 Claims, 4 Drawing Sheets

VIRTUAL TOWING

BACKGROUND

The disclosure relates, in general, to systems and method for vehicle virtual towing, and more specifically to introducing multi-point virtual towing and determining a best multi-point virtual tow route schedule.

Vehicle to vehicle (V2V) communication provides a means for vehicles to exchange information among each other including vehicle position, current speed, rate or incidence of acceleration and deceleration, and braking status. Several applications are being proposed using V2V communications as a foundational technology. One example of a V2V application is virtual towing or electronic towing. In virtual towing one vehicle "trailer" follows a preceding vehicle "tractor" using wirelessly exchanged information without the need for physical attachment between the two vehicles. Such functionality mimics traditional vehicle towing where the trailer is physically attached to the tractor. Virtual towing can serve in scenarios where the towed vehicle driver is incapable of driving or if the towed vehicle is not occupied. Virtual towing serves as a comfort application as well, where it can alleviate driving stress from the towed vehicle driver.

Numerous projects have investigated car following in the past (e.g. PATH). One example of car following concepts that utilize V2V communications is Cooperative Adaptive Cruise Control (CACC). However, CACC is usually viewed as an extension to Adaptive Cruise Control (ACC) which implements only longitudinal control with the driver retaining responsibility for the host vehicle lateral control. In virtual towing, the driver of the trailer is not responsible for control. Further, the trailer may not be occupied.

Several studies have investigated a virtual trailer link model for a pair of vehicles using vehicle sensors, V2V communication, or a combination. One challenge associated with virtual towing is the limit imposed by the inconstancy between trailer and tractor routes. If both vehicles have the same starting point with different destinations, then their paths will separate at a certain point XS. As a result, the tractor guides the trailer only as far as the XS.

SUMMARY OF THE INVENTION

A method of multi-point virtual towing of a trailer vehicle by a plurality of different tractor vehicles along segments of a requested tow path is provided. The method includes receiving a Request for a multi-point virtual tow of a trailer vehicle from a user, the request including a requested tow path having a requested departure location, a requested departure time, a requested destination location, and a requested destination arrival time, receiving Responses to the Request corresponding to prospective tractor vehicles, each response having proposed virtual tow parameters, and determining a multi-point virtual tow route schedule for the multi-point virtual tow from the proposed virtual tow parameters, wherein the multi-point virtual tow route schedule includes a route origin, a route destination, and a plurality of tow segments, wherein each tow segment corresponds to an accepted tractor vehicle, a link up location, link up location distance range, a link up timeframe, a drop off location, a drop off location distance range, and a drop off timeframe.

A system for multi-point virtual towing of a trailer vehicle associated with a User by a plurality of tractor vehicles over respective virtual tow route segments is provided. The system includes at least one server having a having a route generation module which generates one or more candidate multi-point virtual tow route schedules using information received from the trailer vehicle and the plurality of tractor vehicles, a route selection module which uses a route selection algorithm to score and rank the candidate multi-point virtual tow route schedules received from the route generation module to determine one or more best multi-point virtual tow route schedules, and an arbitration module which confirms selection with a User of a best multi-point virtual tow route schedule having a plurality of virtual tow route segments and communicates acceptance notices having respective accepted tow route segment schedules to recipients associated with accepted tractor vehicles selected for the selected best multipoint virtual tow route schedule.

BRIEF DESCRIPTION OF THE DRAWINGS

Like reference numeral will be used to refer to like parts from figure to figure in the following detailed description.

DETAILED DESCRIPTION

Figure 1:
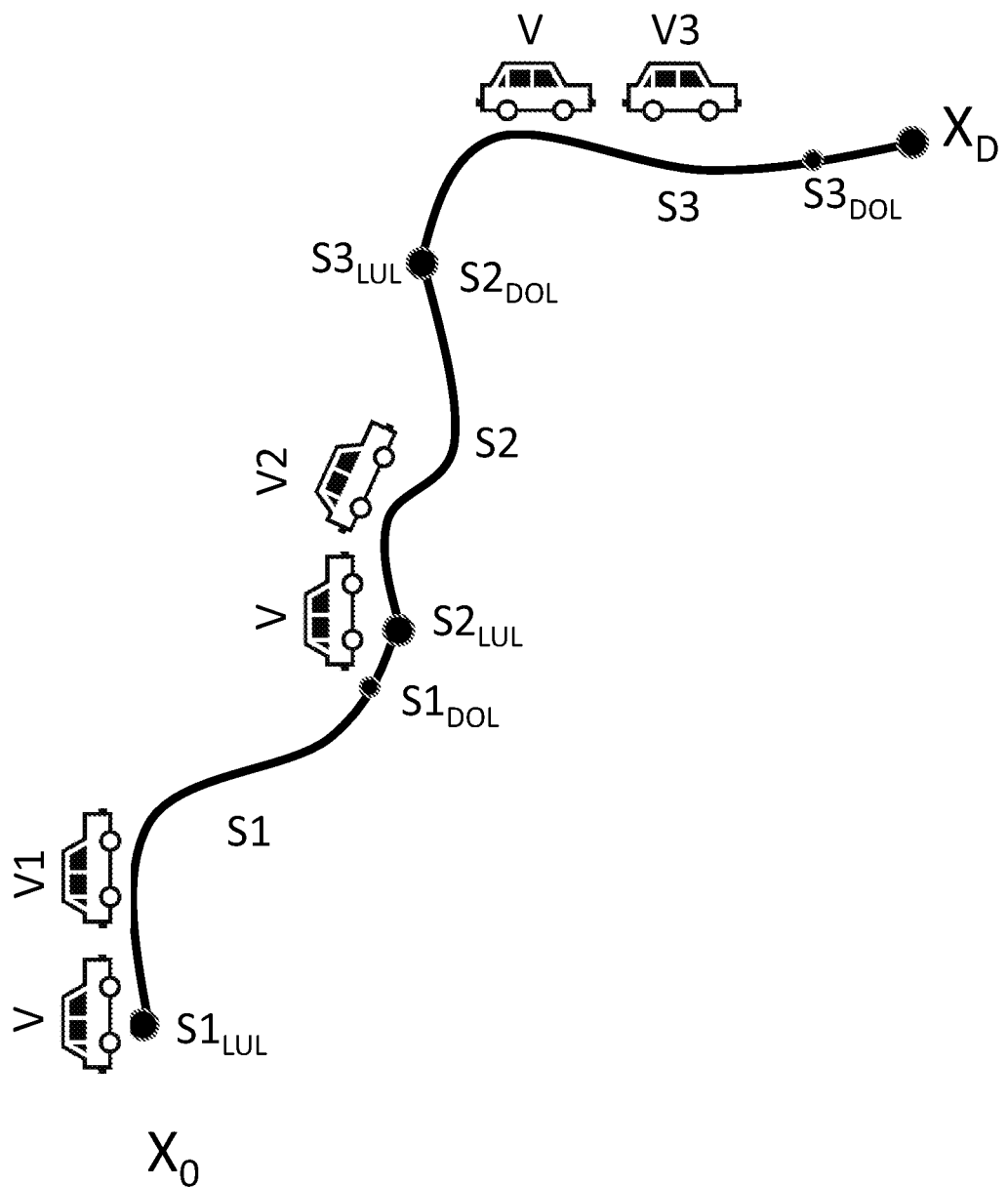
FIG. 1 is a multi-point virtual tow route determined in a manner as described.

The present disclosure is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the disclosure.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein a virtual tow (and virtual towing) is defined as a tractor vehicle moving (i.e. towing) a trailer vehicle without using a physical connection between the vehicles and without the vehicles being in physical contact with each other.

According to the present disclosure, a multi-point virtual towing method enables a vehicle, referred herein as a trailer vehicle V, to be virtually towed by multiple other vehicles, referred to herein as tractor vehicles V1, V2, . . . , VN, along its path. Multi-point towing solves the problem of inconstancy between the path of the trailer vehicle and the paths of the responding tractor vehicles. In one aspect, multiple tractor vehicles are assigned to a single trailer vehicle to optimally achieve the purpose of towing the trailer vehicle from an origin to a destination.

In an example scenario, illustrated in FIG. 1, a User associated with a first trailer vehicle (V) desires a virtual tow from an origin location X0 to a destination location XD. To receive a virtual tow the User accesses a server and submits a Request for a virtual tow, as described in further detail below. The Request includes a requested tow path having a requested departure location and a requested destination location. The Request can also include a requested departure time and a requested destination arrival time.

A group of vehicles P={V1, V2, . . . , VN}, referred to herein as prospective tractor vehicles, are available to provide virtual towing service, typically in exchange for an incentive, such as for example monetary compensation. This group of tractor vehicles can access the server and provide the trailer vehicle V with towing services. However, a single vehicle may not share the entire path, from X0 to XD, with V during the time of requested service. Consequently, V can be virtually towed by multiple vehicles to reach XD. The server can segment the requested tow path of the trailer vehicle V into tow segments S1-SN and distribute the segments among different tractor vehicles V1-VN, as described in further detail below.

In the proposed scenario, a first tractor vehicle V1 will provide a virtual tow to the trailer vehicle V along a first tow segment S1 from a linkup location $S1_{LUL}$ to a drop off location $S1_{DOL}$. The paths of V and V1 then separate at the first segment drop off location $S1_{DOL}$. In some scenarios, S1 closely corresponds to at least a portion of a preplanned travel route for V1. In other scenarios, V1 may be incentivized to alter its preplanned route to coincide with S1. In still other scenarios, V1 may tow for hire and therefore travel route S1 merely to tow V.

A second tractor vehicle V2, assigned to the second tow segment S2, then provides a virtual tow to the trailer vehicle V along the second tow segment S2 from a linkup location $S2_{LUL}$ to a drop off location $S2_{DOL}$. The paths of V and V2 then separate at the second segment drop off location $S2_{DOL}$. Finally in this proposed scenario, a third tractor vehicle V3, assigned to the third tow segment S3, provides a virtual tow to the trailer vehicle V along the third tow segment S3 from a linkup location $S3_{LUL}$ to a drop off location $S3_{DOL}$. The paths of V and V3 then separate at the third segment drop off location $S2_{DOL}$.

Due to the requirements of virtual towing, the trailer vehicle is fully operational, and if necessary and/or desired, the User can drive the trailer vehicle along one or more portions of the tow path. The untowed driving range distance or distances are accounted for by generating candidate multi-point virtual tow route schedules and selecting the best multi-point virtual tow route schedule as described below. For example, $S1_{LUL}$ may be located some distance D1 from the departure location X0 and/or $S3_{DOL}$ may be located some distance D2 from the destination location XD and/or $S1_{DOL}$ may be located some distance D3 from $S2_{LUL}$, in which case the User drives the trailer vehicle untowed over distances D1-D3. If the trailer driver indicates a preference to not drive for longer distances, the method attempts to minimize untowed driving distance. However, this may lead to increase in total travel time/distance depending on the tractor vehicles availability and cost. Thus, if the driver is willing to drive for longer distances the method allows for longer untowed driving ranges to reduce travel time, travel distance and possibly cost of the towing service.

Figure 2:
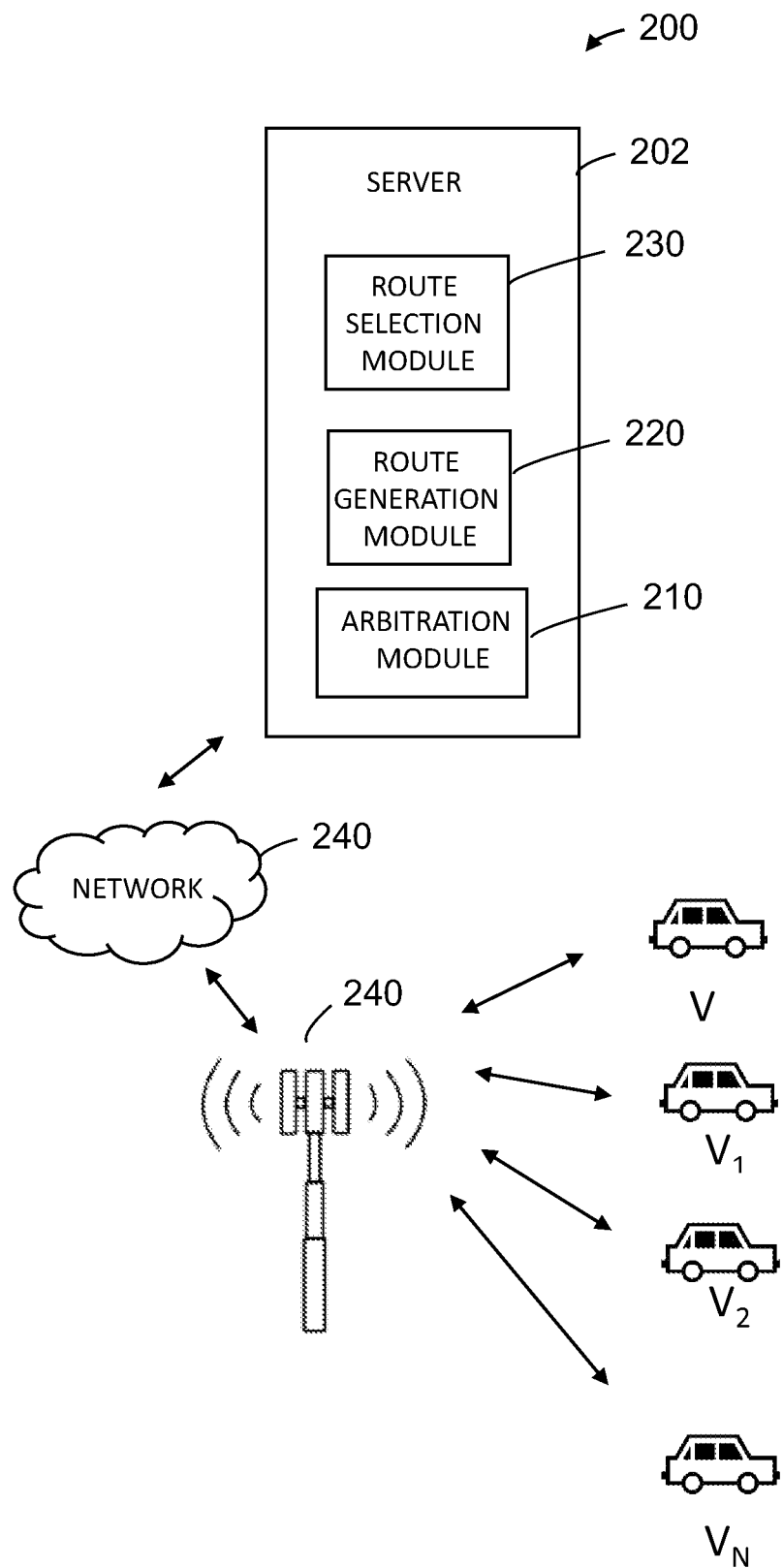
FIG. 2 is a block diagram of a system for selecting a best multi-point virtual tow route schedule as described herein.

Referring now to FIG. 2, a system for multi-point virtual towing is shown generally at 200. The system includes a Server 202 having an Arbitration Module 210, a Route Generation Module 220 and a Route Selection Module 230 which perform the steps described in further detail below. Though Arbitration Module 210, Route Generation Module 220 and Route Selection Module 230 are described as separate process modules, it should be appreciated that one or all of them can be combined into a single functioning process, if so desired.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor. The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories. The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The server 202 can be any suitable electronic processor, computer or the like suitable for performing the tasks as described herein. The server 202 can be a single processing device or distributing processing devices communicating with each other using suitable know protocols. The server 202 communicates with a plurality of vehicles V, V1, V2 . . . VN over a Network 240 using one or more suitable known communication protocols. The Network 240 can be a mobile communications network, also known as a cellular network, a satellite communications network, a Local Area Network (LAN), a Wide Area Network WAN), a Private Network, the Internet, Directed Short Range Communications (DSRC) network or any suitable combination thereof.

The Arbitration Module 210 communicates with the vehicles V1-VN to gather information used for generating candidate multi-point virtual tow route schedules and selecting the best multi-point virtual tow route schedule as described below. The Arbitration Module 210 can also request and obtain further information, if needed, and arbitrate the selection of the best multi-point virtual tow route schedule using the provided criteria associated with the trailer vehicle and the tractor vehicles, as described in further detail below.

The Route Generation Module 220 generates one or more candidate multi-point virtual tow routes and associated multi-point virtual tow route schedules using information provided by the Arbitration Module which is received from the vehicles V1-VN.

The Route Selection Module 230 uses a route selection algorithm to score and rank the candidate multi-point virtual tow route schedules it receives from the Route Generation Module 220 to determine the best multi-point virtual tow route schedule(s). The Route Selection Module 230 transmits the best multi-point virtual tow route schedule(s) to the Arbitration Module 210 which handles final selection (if needed) and confirmation of the best multi-point virtual tow route schedule with the User. The Arbitration Module 210 also handles confirmation and acknowledgement of the selected multipoint virtual tow route schedule with the accepted tractor vehicles which were selected for the different tow route segments in the best multipoint virtual tow route schedule selected/confirmed by the user.

Figure 3:
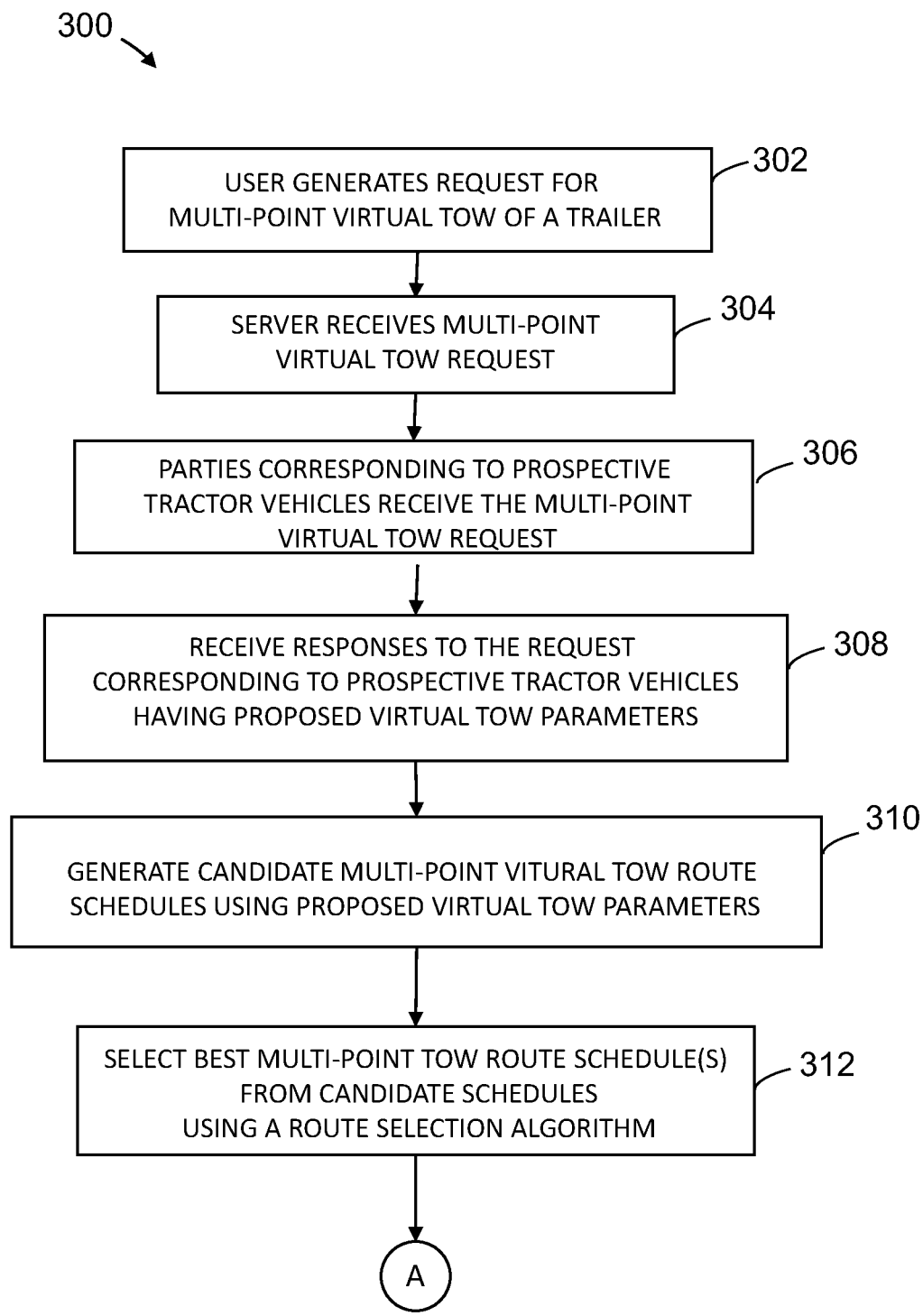
FIG. 3 illustrates a method of selecting a best multi-point virtual tow route schedule as described herein.
Figure 4:
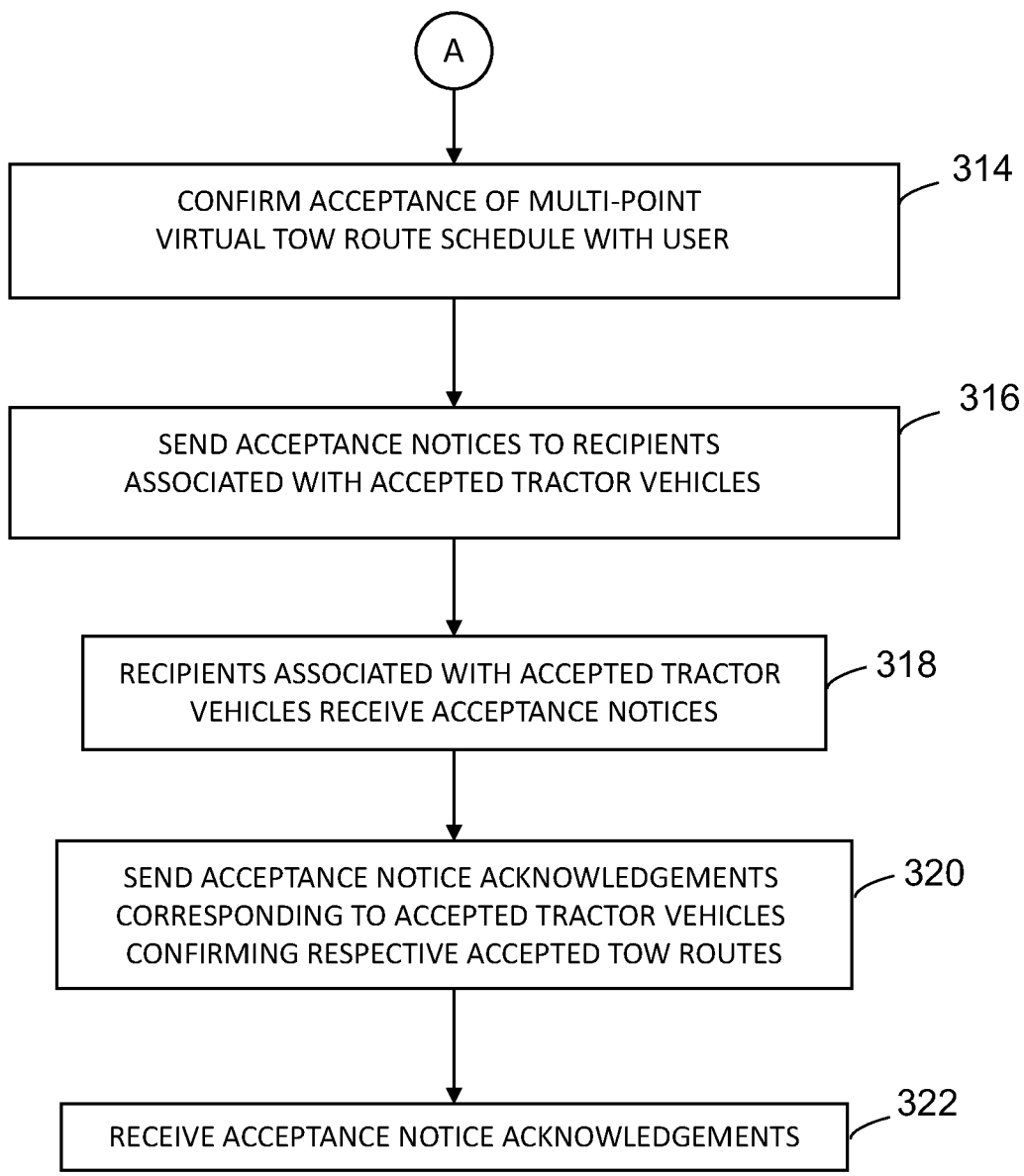
FIG. 4 illustrates a method of selecting a best multi-point virtual tow route schedule as described herein.

Referring now to FIG. 3, a method of virtual towing is shown generally at 300. A User generates a Request for a multi-point virtual tow of a trailer vehicle at 302. The User can create the Request using an application running on the Server 102, on a phone, on a personal computer, on a vehicle Electronic Control Unit or any other suitable computing device. The multi-point virtual tow Request includes a requested tow path having a requested departure location $X_0$, a requested departure time $T_{dep}$, a requested destination location $X_D$, and a requested destination arrival time $T_{arv}$ desired by the user.

The multi-point virtual tow Request can also include trailer vehicle stopping requirements defining a minimum uninterrupted trailer vehicle tow range travel distance, a maximum uninterrupted trailer vehicle tow range travel distance, or both.

The User sends the Request over network to server and server receives the Request at 304. Alternatively, the User generates the Request at the server 102 using an application running on the server or processor connected thereto, such as for example a web-based application, among others. In this example, the User submits the Request which is then received by the server at 304.

Prospective tractor vehicles also receive the Request at 306. The prospective tractor vehicles can receive the details of the Request in a variety of ways. In one example, the server can broadcast the Request to prospective tractor vehicles via the network 240. The Request can be sent via text messages, email messages, SMS messages, or transmitted in application specific messages, such as in a smart phone application directed to arranging a virtual multipoint tow, or in any combination of these. In one embodiment, the server can make the Request available to interested parties via a web-based application running on the server. In other embodiments, the User can broadcast the Request to surrounding vehicles via the network 240.

Upon receiving the details of the multi-point virtual tow request, interested parties corresponding to prospective tractor vehicles can respond by offering virtual tow services. Parties corresponding to prospective tractor vehicles send responses to the Request to the server. The server can thus receive multiple Responses to the User Request at 308. Each Response offers tow service from a prospective tractor vehicle by including proposed virtual tow parameters which correspond to an associated prospective tractor vehicle.

The Route Generation Module 220 uses the proposed virtual tow parameters to generate candidate multi-point virtual tow route schedules at 310. The candidate route schedules are generated by segmenting the requested tow path into route segments which closely approximate the requested tow path. Tractor vehicles having proposed virtual tow parameters that are most suitable to the route segments are assigned to the route segments to tow the trailer vehicle over the route segments as described in further detail below.

A variety of proposed virtual tow parameters are evaluated to generate the candidate route schedules. The provided proposed virtual tow parameters can include link up locations (LUL) which define the beginning of the virtual tow route segment where the respective tractor vehicle proposes to link up with the trailer vehicle to begin virtual towing over an associated route segment;

The proposed virtual tow parameters can also include link up timeframes associated with the link up locations. The Link up timeframes are time period windows during which the prospective tractor vehicle will be available to meet the trailer vehicle at the link up location. The operator of the prospective tractor vehicle can be incentivized to offer larger link up timeframes.

The proposed virtual tow parameters can also include link up distance ranges associated with the link up locations. The link up distance range defines a radius around the proposed link up location which the prospective tractor vehicle is willing to travel to accommodate meeting up with the trailer vehicle. Prospective tractor vehicles can be incentivized to offer larger link up distance ranges.

The proposed virtual tow parameters can also include drop off locations (DOL). The drop off location defines the end point of the virtual tow route segment where the prospective tractor vehicle proposes to drop off the trailer vehicle at the conclusion of the virtual tow route segment.

The proposed virtual tow parameters can also include drop off timeframes associated with the drop off locations. The drop off timeframes are time period windows during which the prospective tractor vehicle will be able to drop off the trailer vehicle at the drop off location. The prospective tractor vehicle can be incentivized to offer larger drop off timeframes.

The proposed virtual tow parameters can also include drop off location distance ranges associated with the drop off locations. The drop off distance range defines a radius around the proposed drop off location which the prospective tractor vehicle is willing to travel to accommodate dropping off the trailer vehicle. Prospective tractor vehicles can be incentivized to offer larger drop off distance ranges.

The proposed virtual tow parameters can also include prospective tractor vehicle routes, and timeframes associated with locations along the prospective tractor vehicle routes which can be used to determine candidate multi-point virtual tow route schedules using the proposed virtual tow parameters.

The proposed virtual tow parameters can also include prospective tractor vehicles stopping requirements which define a minimum uninterrupted tractor vehicle tow range travel distance, a maximum uninterrupted tractor vehicle tow range travel distance or both. A stop performed by either the tractor or the trailer has to be done based on prior consent from both parties which is requested by the Arbitration module. If consent is not obtained, the stopping vehicle may be penalized.

The Route Selection Module 230 uses a route selection algorithm to determine the best multi-point virtual tow route schedules from among the candidate multi-point virtual tow route schedules for the vehicle requesting the service at 312.

The route selection algorithm scores and ranks the candidate multi-point virtual tow route schedules received from the Route Generation Module 220 to determine one or more of the best multi-point virtual tow route schedules. The candidate route schedules each receive a score based on route scoring parameters. The route scoring parameters include route travel time, which is the elapsed time it will take the trailer vehicle V to travel from the route origin to the route destination, the route travel distance which is the distance the trailer vehicle travels over the route from the origin to the destination. Other route scoring parameters include: untowed driving distances, number of tractor vehicles used in the route, and total service cost, among other parameters. Each of these route scoring parameters receives a weighting based on its importance. For example, if the trailer driver is in a hurry, then travel time and distance will receive higher weight compared to other parameters. Another example would be if the trailer driver desires to minimize his/her driving activity, then untowed driving distances receives a high weight. These route scoring parameter weights are calculated for different possible candidate routes to provide a score for each of the candidate routes.

In at least one example, the route selection algorithm selects the best multi-point virtual tow route schedule from among the candidate multi-point virtual tow route schedules. In at least one or more other examples, the route selection algorithm selects the best multi-point virtual tow route schedules from among the candidate multi-point virtual tow route schedules. The best multi-point virtual tow route schedule(s) minimize the time and distance constraints mentioned above. The best multi-point virtual tow route schedule(s) also attempt to minimize the travel time from $X_0$ to $X_D$, minimize the number of different tractor vehicles needed to complete the tow, and accommodate the stopping requirements of both the trailer vehicle V and the tractor vehicles mentioned above.

Other route scoring parameters taken into consideration by the route selection algorithm include trailer vehicle occupancy status. An occupied vehicle being towed requires different considerations than an empty vehicle being towed. For example, passengers' comfort has to be taken into consideration when the vehicle is occupied. An unoccupied vehicle status is used to restrict constraints on the times of pickup and delivery. However, an unoccupied vehicle status is used to relax other constraints related to number of stops and number of tractor vehicles used in the tow route.

Trailer vehicle driver willingness to drive portions of the tow route are also route scoring parameters. When the trailer vehicle driver agrees to drive particular portions of the tow route travelling in an untowed configuration, a larger number of candidate routes can be generated and used in the selection process. Such solutions would be useful if there are no tractor vehicles available for towing the trailer vehicle for the entire desired route, or if the driver participation would significantly enhance the route efficiency. However, a best multi-point virtual tow route schedule is typically one in which the untowed trailer travel distance is minimized.

The Arbitrator Module 210 sends the multi-point virtual tow route schedule, or multiple top ranking schedules from which to choose, selected at 312 to the User to confirm the User's acceptance of one multi-point virtual tow route schedule at 314. Upon confirmation of user acceptance multi-point virtual tow route schedule at 314, the Arbitrator Module 210 sends acceptance notices at 316 to recipients associated with accepted tractor vehicles which are used in the accepted multi-point virtual tow route schedule. The acceptance notices include the route segment, link up location, link up time, drop off location, and drop off time and stopping requirements corresponding to the route segment assigned to the accepted tractor vehicle. The acceptance notices request recipients acknowledge receipt of the acceptance notices to confirm their participation. These recipients associated with the accepted tractor vehicles send acceptance notice acknowledgements back to the Arbitrator Module 210 at 320 which receives them at 322 to complete the enrollment of the accepted tractor vehicles in the selected/confirmed multi-point virtual tow route schedule.

The trailer vehicle then proceeds to receive the multipoint virtual tow services provided by the accepted tractor vehicles as arranged in the accepted multipoint virtual tow route schedule described above, such as for example, as described in reference to FIG. 1.

The present disclosure has been described in terms of one or more preferred embodiments, and it should be appreciated that many equivalents, alternatives, variations, and modifications, aside from those expressly stated, are possible and within the scope of the disclosure.

While present inventive concepts have been described with reference to particular embodiments, those of ordinary skill in the art will appreciate that various substitutions and/or other alterations may be made to the embodiments without departing from the spirit of present inventive concepts. Accordingly, the foregoing description is meant to be exemplary, and does not limit the scope of present inventive concepts.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the present inventive concepts.

What is claimed is:

1. A method of multi-point virtual towing comprising:
receiving a request for a multi-point virtual tow of a trailer vehicle from a user, the request including a requested tow path having a requested departure location, a requested departure time, a requested destination location, and a requested destination arrival time;
receiving a first response to the request corresponding to a first prospective tractor vehicle, the first response including first proposed virtual tow parameters;
receiving a second response to the request corresponding to a second prospective tractor vehicle, the second response including second proposed virtual tow parameters; and
determining a multi-point virtual tow route schedule for the multi-point virtual tow from the first and second proposed virtual tow parameters associated with the first prospective tractor vehicle and the second prospective tractor vehicle, wherein the multi-point virtual tow route schedule includes a route origin, a route destination, a first tow segment, and second tow segment, wherein the first tow segment corresponds to a segment where the trailer vehicle follows the first prospective tractor vehicle after acceptance of the first response based on wirelessly exchanged information between the trailer vehicle and the prospective tractor vehicle, and wherein the second tow segment corresponds to a segment where the trailer vehicle follows the second prospective tractor vehicle after acceptance of the second response based on wirelessly exchanged information between the trailer vehicle and the second prospective tractor vehicle.

wherein each of the first tow segment and the second tow segment are associated with a link up location a link up location distance range, a link up timeframe, a drop off location, a drop off location distance range, and a drop off timeframe, respectively, wherein the link up location distance range includes a predefined radius around the link up location in which the first or second prospective tractor vehicles will travel to link with the trailer vehicle and the drop off location distance range includes a predefined radius around the drop off location in which the first or second prospective tractor vehicles will travel to drop off the trailer vehicle.

2. The method of claim 1 wherein the first and second proposed virtual tow parameters comprise:
the link up location;
the link up timeframe associated with the link up location;
the link up location distance range;
the drop off location;
the drop off timeframe associated with the drop off location; and
the drop off location distance range.

3. The method of claim 2 wherein the first and second proposed virtual tow parameters further comprise:
prospective tractor vehicle routes; and
timeframes associated with locations along the prospective tractor vehicle routes.

4. The method of claim 1 wherein the first and second proposed virtual tow parameters further comprise stopping requirements for the first or second prospective tractor vehicles defining minimum uninterrupted tractor vehicle tow range travel distance and a maximum uninterrupted tractor vehicle tow range travel distance.

5. The method of claim 4 further comprising confirming the stopping requirements with the user, wherein the determining the multi-point virtual tow route schedule uses the stopping requirements.

6. the method of claim 1 further comprising determining a user untowed driving range distance for the trailer vehicle, wherein the determining the multi-point virtual tow route schedule uses the user untowed driving range distance.

7. The method of claim 1 wherein the request for the multi-point virtual tow further comprises trailer vehicle stopping requirements defining at least one of a minimum uninterrupted trailer vehicle tow range travel distance and a maximum uninterrupted trailer vehicle tow range travel distance, and wherein the determining the multi-point virtual tow route schedule uses the trailer vehicle stopping requirements.

8. The method of claim 1 further comprising:
confirming acceptance of the multi-point virtual tow route schedule with the user;
sending acceptance notices having respective accepted tow route segment schedules to recipients associated with the first accepted tractor vehicle and the second accepted tractor vehicle; and
receiving acceptance notice acknowledgements corresponding to the first accepted tractor vehicle and the second accepted tractor vehicle confirming respective first and second accepted tow routes.

9. The method of claim 8 wherein the determining the multi-point virtual route schedule further comprises:
determining candidate multi-point virtual tow route schedules using the first and second proposed virtual tow parameters;
selecting best multi-point virtual tow route schedules;
sending the best multi-point virtual tow route schedules to the user; and
receiving a user-selected multi-point virtual tow route schedule selected from the best multi-point virtual tow route schedules.

10. The method of claim 8 wherein the determining the multi-point virtual tow route schedule further comprises:
determining one or more candidate multi-point virtual tow route schedules using the first and second proposed virtual tow parameters; and
selecting the multi-point virtual tow route schedule from the one or more candidate multi-point virtual tow route schedules using a route selection algorithm.

11. The method of claim 10 wherein the determining the multi-point virtual tow route schedule uses at least one of a savings method algorithm, a sweeps algorithm and a tabu heuristic.

12. The method of claim 1 wherein determining the multi-point virtual tow route schedule further comprises minimizing time constraints including the link up timeframes and drop off timeframes and minimizing distance constraints including the link up location distance ranges and the drop off location distance ranges to find a best multi-point virtual tow route schedule.

13. The method of claim 1 further comprising:
determining an occupancy status of the trailer vehicle intended during the multi-point virtual tow, wherein the occupancy status includes an occupied condition wherein the trailer vehicle contains one or more persons during the tow and an unoccupied condition wherein the trailer vehicle does not contain a person during the multi-point virtual tow, wherein determining the multi-point virtual tow route Schedule accommodates for the occupancy status of the trailer vehicle intended during the multi-point virtual tow.

14. A method of virtual towing of a trailer vehicle by a first tractor vehicle and a second tractor vehicle, comprising:
submitting a user request for a multi-point virtual tow of the trailer vehicle, the request including a requested tow path having a requested departure location, a requested departure time, a requested destination location, and a requested destination arrival time; and
receiving a multi-point virtual tow route schedule including a route origin, a route destination, a first tow segment, and a second tow segment wherein each of the first tow segment and the second two segment has a first accepted tractor vehicle and second accpeted tractor vehicle, respectively, a link up location, a link up location distance range, a link up timeframe, a drop off location, a drop off location distance range, and a drop off time frame, wherein the link up location distance range for the associated first or second accepted tractor vehicle includes a predefined radius around the link up location in which the corresponding first or second tractor vehicle will travel to link with the trailer vehicle and the drop off location distance range includes a predefined radius around the drop off location in which the corresponding first or second tractor vehicle will travel to drop off the trailer vehicle, wherein each of the first tow segment and the second two segment of the multi-point virtual tow is associated with the trailer vehicle following the corresponding first or second accepted tractor vehicle based on wirelessly exchanged information.

15. The method of claim 14 further comprising receiving acceptance notice acknowledgements corresponding to the first and second accepted tractor vehicle confirming respective first and second accepted tow routes.

16. The method of claim 14 further comprising:
receiving a virtual tow from the first tractor vehicle over the first tow segment; and receiving a virtual tow from the second tractor vehicle over the second tow segment, wherein the first tractor vehicle is different than the second tractor vehicle, wherein the first tractor vehicle is not present during the virtual tow over the second tow segment.

17. A system for multi-point virtual towing of a trailer vehicle associated with a user by a first tractor vehicle and a second tractor vehicle over respective first and second tow segments, the system comprising:
at least one server having a route generation module, wherein the route generation module generates one or more candidate multi-point virtual tow route schedules using information received from the trailer vehicle, the first tractor vehicle, and the second tractor vehicle,
a route selection module which uses a route selection algorithm to score and rank the one or more candidate multi-point virtual tow route schedules received from the route generation module to determine one or more best multi-point virtual tow route schedules, and
an arbitration module which confirms selection with the user of a best multi-point virtual tow route schedule having a first tow segment and a second tow segment and communicates acceptance notices having respective first and second accepted tow routes segment schedules to recipients associated with accepted tractor vehicle selected for the best multipoint virtual tow route schedule,
wherein each of the first tow segment and the second tow segment corresponds to a corresponding first and second accepted tractor vehicle, each associated with a link up location, a link up location distance range, a link up time frame, a drop off location, a drop off location distance range, and a drop off time frame, wherein the link up location distance range includes a predefined radius around the link up location in which at least on tractor vehicle will travel to link with the trailer vehicle and the drop off location distance range includes a predefined radius around the drop off location in which the at least one tractor vehicle will travel to drop off the trailer vehicle, wherein each of the first tow segment and the second tow segment of the multi-point virtual tow is associated with the trailer vehicle following the corresponding first or second accepted tractor vehicles based on wirelessly exchanged information, and wherein the route selection module scores and ranks the one or more candidate multi-point virtual tow route schedules based on a number of tractor vehicles to be used.

18. the system of claim 17 wherein the route generation module generates the one or more candidate multi-point virtual tow route schedules using a user requested tow path having a requested departure location, a requested departure time.

19. The system of claim 18 wherein the route generation module generates the one or more candidate multi-point virtual tow route schedules using first and second proposed virtual tow parameters from corresponding first and second prospective tractor vehicles, the first and second proposed virtual tow parameters comprising:
the link up location;
the link up timeframes associated with the link up location;
the link up location distance range;
the drop off location;
the drop off location;
the drop off timeframe associated with the drop off location; and
the drop off location distance range.

20. The system of claim 19 wherein the route generation module generate the one or more candidate multi-point virtual tow route schedules using stopping requirements for the corresponding first and second prospective tractor vehicles defining at least one of a minimum uninterrupted tractor vehicle tow range travel distance and a maximum uninterrupted tractor vehicle tow range travel distance and trailer vehicle stopping requirements defining at least one of a minimum uninterrupted trailer vehicle tow range travel distance and a maximum uninterrupted trailer vehicle tow range travel distance.

* * * * *

UNITED STATES PATENT AND TRADEMARK OFFICE
CERTIFICATE OF CORRECTION

PATENT NO. : 10,309,791 B2
APPLICATION NO. : 14/931926
DATED : June 4, 2019
INVENTOR(S) : Samer Rajab et al.

Page 1 of 1

It is certified that error appears in the above-identified patent and that said Letters Patent is hereby corrected as shown below:

In the Claims

Column 12, Claim 19, Line 35 remove "the drop off location;"

Signed and Sealed this
Twenty-seventh Day of August, 2019

Andrei Iancu
*Director of the United States Patent and Trademark Office*